United States Patent
Mlodzik

(10) Patent No.: US 10,028,362 B2
(45) Date of Patent: Jul. 17, 2018

(54) LOCATOR LIGHTS

(71) Applicant: Steven G. Mlodzik, Southern Pines, NC (US)

(72) Inventor: Steven G. Mlodzik, Southern Pines, NC (US)

(*) Notice: Subject to any disclaimer, the term of this patent is extended or adjusted under 35 U.S.C. 154(b) by 712 days.

(21) Appl. No.: 14/535,784

(22) Filed: Nov. 7, 2014

(65) Prior Publication Data

US 2016/0131386 A1   May 12, 2016

(51) Int. Cl.
| | | |
|---|---|---|
| F24F 11/00 | (2018.01) | |
| H05B 39/04 | (2006.01) | |
| H05B 37/02 | (2006.01) | |
| H05B 33/08 | (2006.01) | |
| G06Q 10/00 | (2012.01) | |
| G05B 15/02 | (2006.01) | |

(52) U.S. Cl.
CPC .......... *H05B 39/041* (2013.01); *G05B 15/02* (2013.01); *G06Q 10/20* (2013.01); *H05B 33/0845* (2013.01); *H05B 37/0209* (2013.01); *H05B 37/0254* (2013.01)

(58) Field of Classification Search
CPC ..... F24F 11/0009; G06Q 10/20; G05B 15/02; H05B 37/0209; H05B 33/0845; H05B 39/041
See application file for complete search history.

(56) References Cited

U.S. PATENT DOCUMENTS

| | | |
|---|---|---|
| 6,693,512 B1 | 2/2004 | Frecska et al. |
| 6,764,196 B2 | 7/2004 | Bailey |
| 6,881,142 B1 | 4/2005 | Nair |
| 7,382,271 B2 | 6/2008 | McFarland |
| 7,645,052 B2 | 1/2010 | Villard |
| 2004/0158359 A1* | 8/2004 | Frecska .................. G05B 15/02 700/276 |
| 2011/0115816 A1* | 5/2011 | Brackney ............... G06Q 10/06 345/629 |
| 2011/0221574 A1 | 9/2011 | Eckl et al. |
| 2012/0319818 A1 | 12/2012 | Unger et al. |
| 2014/0088777 A1* | 3/2014 | Allmaras .................. H02J 3/32 700/295 |

\* cited by examiner

*Primary Examiner* — Umut Onat
(74) *Attorney, Agent, or Firm* — Coats & Bennett, PLLC

(57) ABSTRACT

A locator light assembly comprising at least a light-emitting transducer and a current limiting resistance is connected to an unused digital output of equipment disposed behind a surface comprising panels. The locator light is disposed in a panel of the surface such that, when illuminated, it is visible from the front side of the surface. The locator light is illuminated by writing a value to a digital output port of the equipment. Such writing may be a command from a Facilities Maintenance Program (FMP), and may occur via a network linking the equipment to a processor running the FMP. By immediately identifying the proper panel to remove for access to the equipment, by seeing the illuminated locator light, a technician may directly access the equipment.

7 Claims, 9 Drawing Sheets

LOCATOR LIGHTS

FIELD OF INVENTION

The present invention relates generally to HVAC control, and in particular to locator lights indicating which panel of a surface should be removed to gain access to equipment hidden behind the surface.

BACKGROUND

Modern commercial buildings and campuses typically feature centralized Heating, Ventilating, and Air Conditioning (HVAC), under the control of a Facilities Maintenance Program (FMP). As used herein, the term FMP encompasses any control program that manages, monitors, controls, troubleshoots, and otherwise operates a building's or campus' HVAC system. Most FMPs provide a Graphical User Interface (GUI) based control panel, whereby one or more facilities maintenance personnel can monitor and control the entire HVAC system from a single terminal or mobile device. Many FMPs include performance monitoring and fault detection/reporting features, whereby the performance and responsiveness of equipment in the HVAC system is monitored, and any errors or faults are reported, such as by triggering various audible and/or visible alarms associated with the faulty equipment. Upon detecting such a fault, facilities maintenance personnel may direct technicians to the room or area where the faulty equipment is located, for inspection, troubleshooting, maintenance, repair, replacement, or other service.

Rooms, hallways, and open areas in modern buildings are typically provided with a drop ceiling. As well known in the construction and facilities maintenance arts, a drop ceiling (also known as a suspended ceiling or false ceiling) is a surface, comprising a large plurality of removable panels, that is suspended from a structural ceiling, providing an aesthetic and acoustic "false" ceiling. Fluorescent lighting fixtures, HVAC air supply and return vents, smoke detectors, cameras, fire suppression sprinkler heads, and various other equipment may be mounted to or within the drop ceiling. Above the drop ceiling, and normally hidden from view, various utilities and equipment are disposed in the space between the drop ceiling and the structural ceiling. Such utilities and equipment may include electrical wires, telephone and data cables, hot and cold water pipes, and HVAC equipment such as Variable Air Volume (VAV) units. VAVs control the temperature and air flow into a room or area, in response to a local thermostat and/or parameters set and controlled by the FMP. Locating VAVs above a drop ceiling "hides" them from building occupants, and insulates the occupants from much of the noise of their operation.

A known problem with hiding the VAVs behind a drop ceiling is that the equipment is also hidden from HVAC service technicians. When a VAV requires inspection, adjustment, troubleshooting, maintenance, or other service, a technician may be informed (e.g., by personnel operating the FMP) in which room or area the faulty equipment is located. However, the technician generally has no idea which drop ceiling panel should be removed to access the equipment. The location of a supply air vent is not a reliable indicator, as the vent may be located some distance from the VAV, with air traveling through a duct between the two. Accordingly, he or she generally erects and climbs a ladder, removes a panel essentially at random, and shines a flashlight around the space between the drop ceiling and the structural ceiling, to locate the VAV. Once located, the technician estimates which drop ceiling panel would provide the best access to the VAV, replaces the trial panel, descends the ladder, moves the ladder to a new location, and again climbs it and removes another ceiling panel.

In areas where cleanliness is a particular concern, such as some hospital wards, removing a drop ceiling panel requires even more effort. A ceiling-to-floor dust containment curtain must be erected around a ladder, such that the entire ceiling panel to be removed lies within the confines of the curtain. The erection and disassembly of such a curtain, along with the necessary clean-up, represents a large waste of time and effort when the purpose of removing the first panel is only to locate the VAV equipment, and ascertain which panel should be removed to access it.

Although described in terms of a drop ceiling, locating equipment behind any surface comprising removable panels is problematic. For example, air handling equipment is often located below an elevated floor in computer rooms and data centers; the same problem exists in locating the proper flooring panel to remove to gain access to faulty equipment. Furthermore, in some installations, various alarms, cameras, video projectors, and the like, may be located behind vertical walls having removable panels. In general, a quick, easy, inexpensive manner of locating the proper panel of a surface (of any orientation) to be removed to provide access to faulty equipment located behind the surface, and in particular one that may be easily retrofitted to existing buildings and installations, would be advantageous.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a locator light assembly comprising at least a light-emitting transducer and a current limiting resistance is connected to an unused spare digital output of equipment potentially requiring service, where the equipment is disposed behind a surface comprising a plurality of panels. The locator light is disposed in a panel of the surface such that, when illuminated, it is visible from the front side of the surface (opposite the side where the equipment is located). The locator light is illuminated by writing a value to a digital output port of the equipment that is operative to output voltage on the digital output to which the locator light is connected. Such writing may a command from a Facilities Maintenance Program (FMP), and may occur via a network linking the equipment to a processor running the FMP. By immediately identifying the proper panel to remove from the surface for access to the equipment, by seeing the illuminated locator light, the expenditure of time and effort to remove a panel at random to locate the equipment (and replace it and then remove the proper panel) are avoided.

One embodiment relates to a method, performed by one or more processors executing a management program for a building climate control system, of indicating the location of equipment requiring service. The equipment is disposed behind a surface comprising a plurality of removable panels. The fact that a first instance of equipment requires service is ascertained. The fact that the first instance of equipment requires service is indicated. User input to locate the equipment for service personnel is accepted. In response to the user input to locate the equipment, the first instance of equipment is controlled to output a value on one or more output ports. The value on the one or more output ports is operative to energize one or more corresponding indicator lights disposed on the visible side of the removable surface and indicating to service personnel which of the plurality of removable panels should be removed to access the first instance of equipment.

Another embodiment relates to a locator light assembly. The assembly includes a light-emitting transducer disposed within a panel of a surface. The surface has a front side and a back side, and includes a plurality of removable panels. The transducer is disposed so as to be visible, when illuminated, from the front side of the surface. The assembly also includes one or more conductors connecting the transducer to one or more digital outputs of a first instance of equipment disposed behind the surface, facing the back side of the surface. The assembly further includes a current limiting resistance interposed in series between the digital output and the transducer, and operative to alter a voltage at the transducer from a voltage at the digital output.

Yet another embodiment relates to a method of locating equipment requiring service. The equipment is disposed behind a surface having a front and back side and comprising a plurality of removable panels. An indicator of a room or area in which the equipment is located is received. The surface in the indicated room or area is inspected. A panel of the surface is identified by a locator light disposed within the panel being illuminated. The locator light is visible from the front side of the surface. A panel is removed from the surface. In one embodiment, the panel removed is the panel in which the illuminated locator light is disposed. In another embodiment, the panel removed is the panel panel adjacent to the one in which the illuminated locator light is disposed. The equipment requiring service is located through the removed surface panel.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
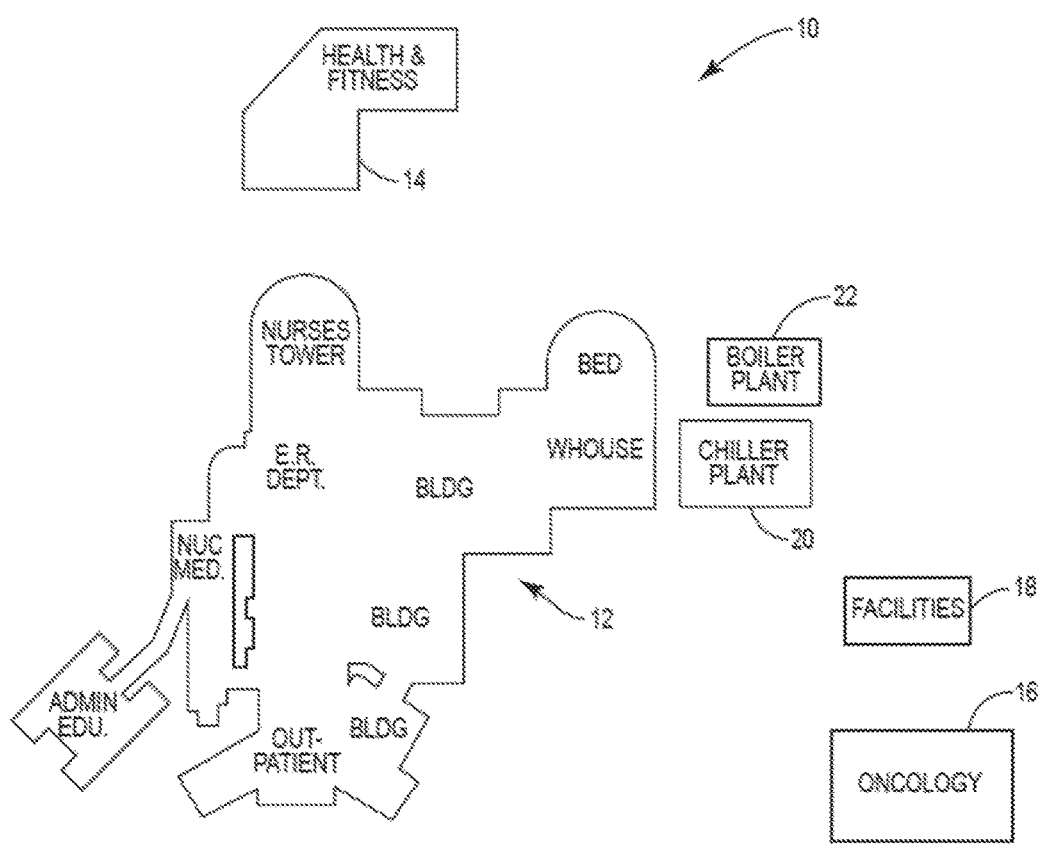
FIG. 1 is a plan view of a facility or campus having central HVAC control.

FIG. 1 depicts a plan view of a facility 10—in this case, a hospital—having an integrated HVAC system under the control of a Facilities Maintenance Program (FMP). The facility 10 comprises a main building complex 12, health & fitness center 14, oncology department building 16, facilities building 18, chiller plant 20, and boiler plant 22. The particular facility 10 depicted is only representative, and in other embodiments may comprise an educational campus, one or more office buildings, a shopping mall, or the like.

The chiller plant 20 supplies chilled water, e.g., at 42° F., to one or more Air Handler Units (AHU). The AHU uses the chilled water to cool supply to a predetermined temperature, e.g., 54° F., and relative humidity, e.g. 50%. This chilled supply air is distributed throughout the buildings 12, 14, 16, and is heated to a desired temperature, as indicated by a local thermostat, by a Variable Air Volume (VAV) unit in each room or area associated with a thermostat.

Figure 2:
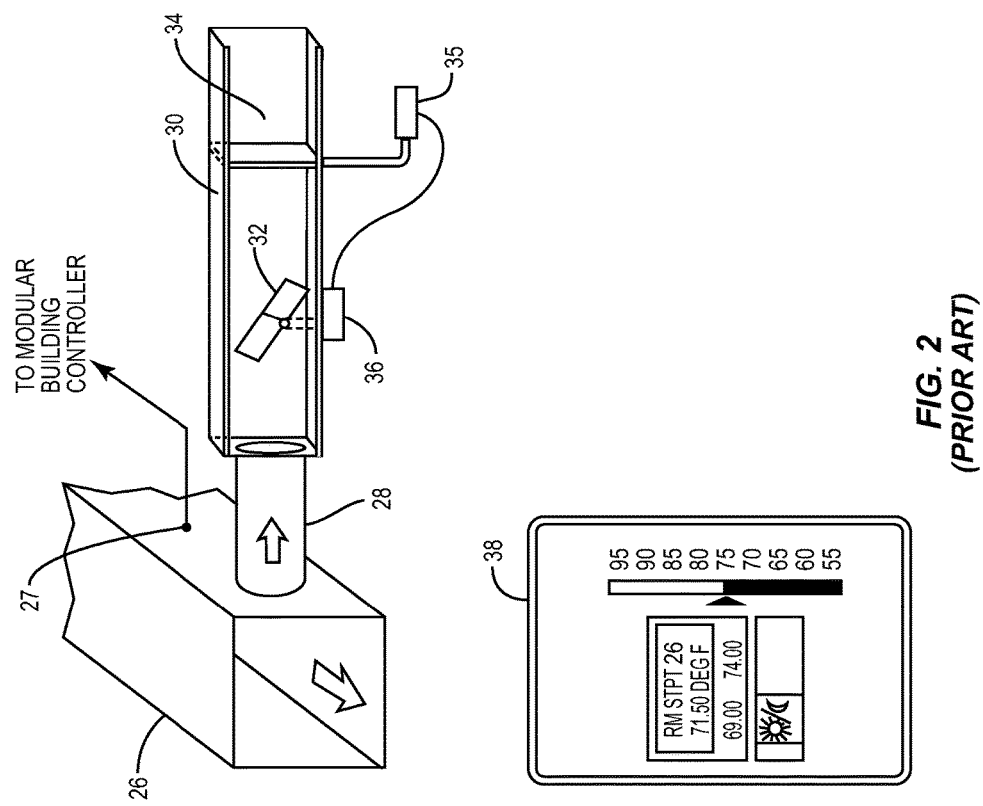
FIG. 2 is a perspective view of a Variable Air Volume (VAV) unit and a thermostat.

FIG. 2 depicts a functional diagram of one embodiment of a representative Variable Air Volume (VAV) unit. Chilled air from the AHU (e.g., at 54° F.) is supplied by a main duct 26. A sensor 27 may comprise an air flow sensor, a temperature sensor, or the like. The sensor 27 reports its readings to a modular building controller (not shown). The sensor 27 is representative of an element of the HVAC system which may require inspection or replacement during its service life. A portion of the chilled air travels down an auxiliary duct 28 and into a VAV unit 30. The VAV controls the volume of air output through a supply vent (not shown) into a room or area by altering the position of a damper 32. The air flowing past the damper 32 may be reheated by a reheat coil 34, so as to maintain the temperature setting of the thermostat 38. The reheat coil 34 carries hot water from a heat exchanger that is supplied with steam from the boiler plant 20. Both the position of the damper 32 and the flow of hot water through the reheat coil 34 are controlled by Terminal Equipment Controller (TEC) 36, in response to the local thermostat 38, to provide air at a desired temperature. Note that heating the air by the reheat coil 34 will lower its relative humidity.

Both the damper 32 and the flow of hot water through reheat coil 34 are controlled by a TEC 36 associated with each VAV unit. The TEC may operate in stand-alone mode, based on inputs from the thermostat and an ambient air temperature sensor, or it may be part of a network, controlled by a FMP. A suitable TEC is the Terminal Box Controller available from Siemens Industry, Inc. of Buffalo Grove Ill.

Figure 3:
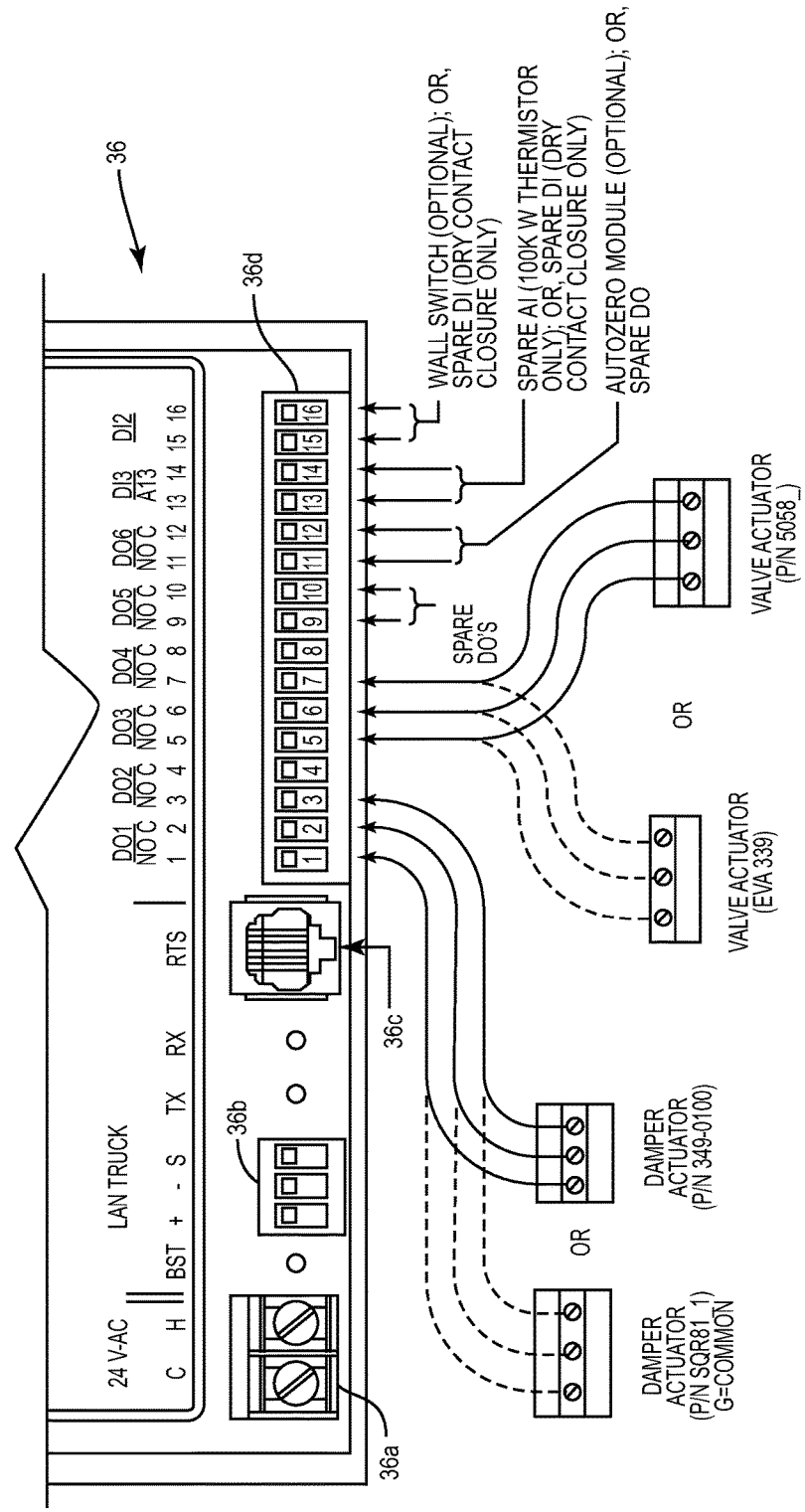
FIG. 3 is a diagram of inputs and outputs of a Terminal Equipment Control (TEC) unit.

FIG. 3 depicts input/output (I/O) connections of the TEC 36. These include a 24V AC input block 36a, a Local Area Network (LAN) data connection block 36b, a local temperature sensor input block 36c, and a digital output port 36d. The digital output port 36d comprises a plurality of digital outputs, e.g., ranging from DO1 (terminals 1 & 2) to DO6 (terminals 11 & 12) in the embodiment depicted in FIG. 3 (as well as two digital inputs DI3 and DI2). Each digital output comprises two terminals, one of which is designated "common," or ground. All common terminals are tied together. When a value is written to the digital output port 36d having a "1" in a bit position corresponding to a digital output, a 24 VAC signal appears on the non-common terminal; writing a "0" to the bit position outputs 0 V. Some of the digital outputs are predefined, such as for connection to a damper 32 actuator (DO1-2) or a hot water valve 35 actuator (DO3-4). Various other output port 36d terminals may be predefined. Additionally, the TEC 36 digital output port 36d may include spare digital outputs, such as DO5 (comprising terminals 9 and 10), in the embodiment depicted in FIG. 3.

According to embodiments of the present invention, a locator light assembly is connected to an unused spare digital output of the TEC 36. The locator light assembly is powered by writing, via the FMP, one or more predetermined values to the digital output port 36d that outputs a digital "1" on one or more spare digital output terminals.

Figure 4:
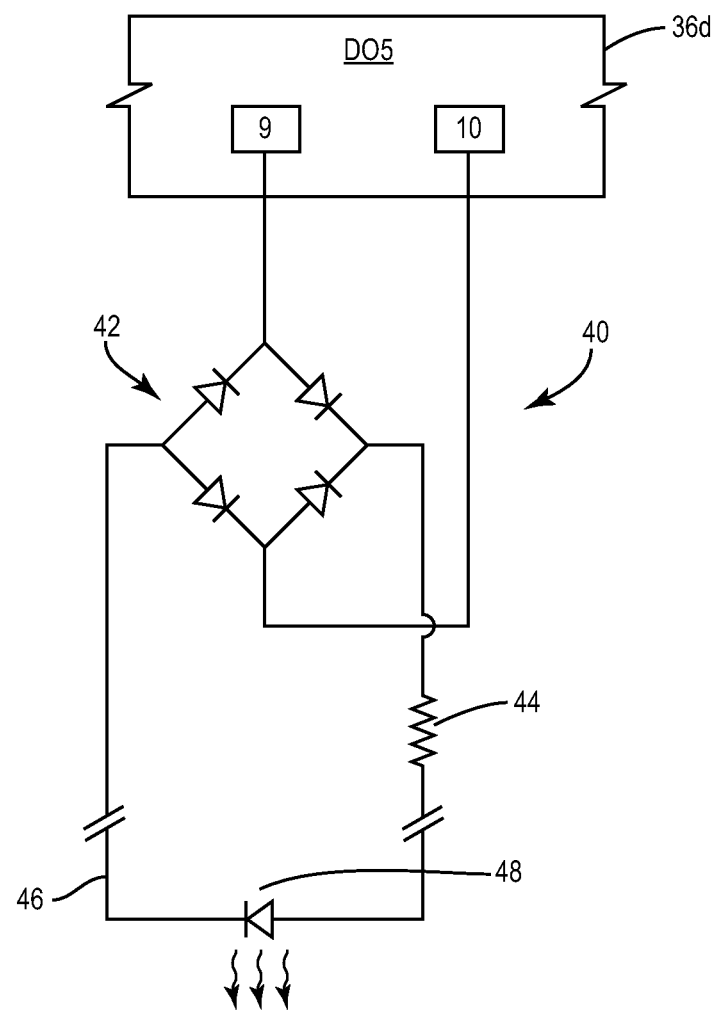
FIG. 4 is an electrical schematic diagram of a locator light assembly.

FIG. 4 depicts a representative schematic diagram of a locator light assembly 40 according to one embodiment. The locator light assembly 40 is attached to the active and common terminal comprising an unused spare digital output of the digital output port 36d of the TEC 36. When the digital output is activated by the FMP, a full wave bridge rectifier 42 converts the AC voltage to DC, as well known in the art. A current limiting resistor 44 limits the current in the locator light assembly 40, and also reduces the DC voltage from the output of the full wave bridge rectifier 42. At the other end of a wire 46 of appropriate length, a light-emitting transducer, such as an LED 48, incandescent bulb, or the like, illuminates when a "1" is applied to the digital output DO5. Subsequently writing a "0" to the digital output DO5 removes voltage from the rectifier 42, and extinguishes the light-emitting transducer 48. Note that in the case of a TEC 36 or other equipment with a digital output port outputting a DC voltage (e.g., +5 VDC), the full wave bridge rectifier 42 may be omitted, with the current limiting resistor 44 being connected directly to the positive output terminal.

Figure 5:
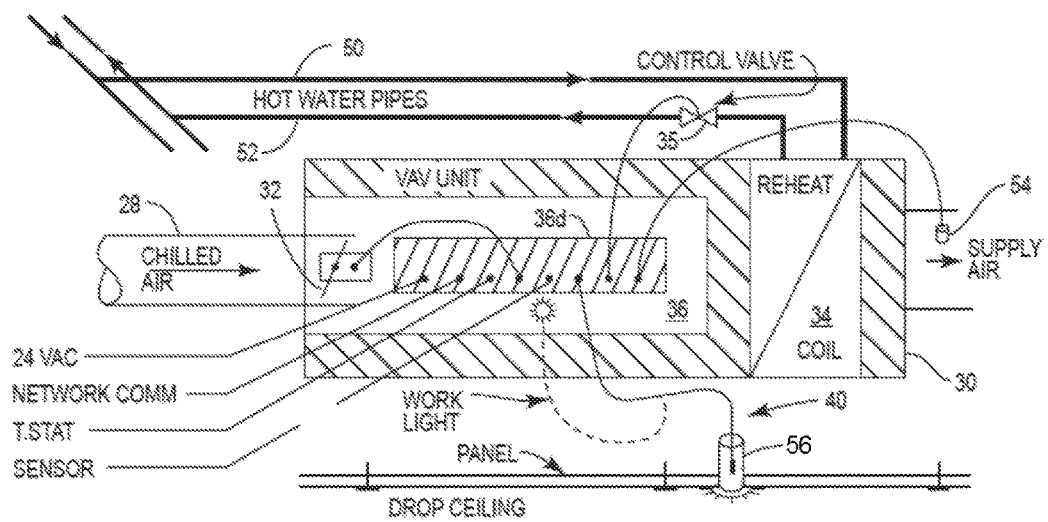
FIG. 5 is a schematic representation of a VAV/TEC disposed above a drop ceiling, with a locator light assembly connected.

FIG. 5 depicts a schematic view of a VAV unit 30 installed above a drop ceiling. Chilled air is supplied through a duct 28, and the airflow through the VAV 30 is controlled by a damper 32. The air is heated by a reheat coil 34, the temperature of which is controlled by controlling a valve 35 in either of the hot water supply 50 or return 52 pipes. Supply air exits the VAV unit 30 and is directed through a vent into the room or area being controlled. A temperature sensor 54 in the supply air flow may monitor the air temperature. Connected to the TEC 36 are a variety of utility, sensor and communication inputs, and control outputs. Such inputs may include 24 VAC power, control signals from the thermostat 38, temperature sensors, and the like. Outputs may include damper 32 actuator control, hot water control valve 35 control, and the like.

Connected to an unused spare digital output is a locator light assembly 40, which is positioned within a tubular sleeve 56 disposed in a through-hole in a panel of the drop ceiling. The sleeve 56 holds the light-emitting transducer 48 of the locator light assembly 40 in a position flush with the lower, or front, side of the drop ceiling panel. A diffusing lens, generally flush with the lower surface of the drop ceiling panel, conceals the transducer 48 when it is not illuminated. The locator light assembly 40 maintains a friction fitting within the sleeve 56, from which it may be easily removed when the drop ceiling panel is removed. The locator light assembly 40 may then be used as a task light to illuminate the TEC 36 or VAV 30 requiring service, as indicated by the dashed line in FIG. 5.

Figure 6:
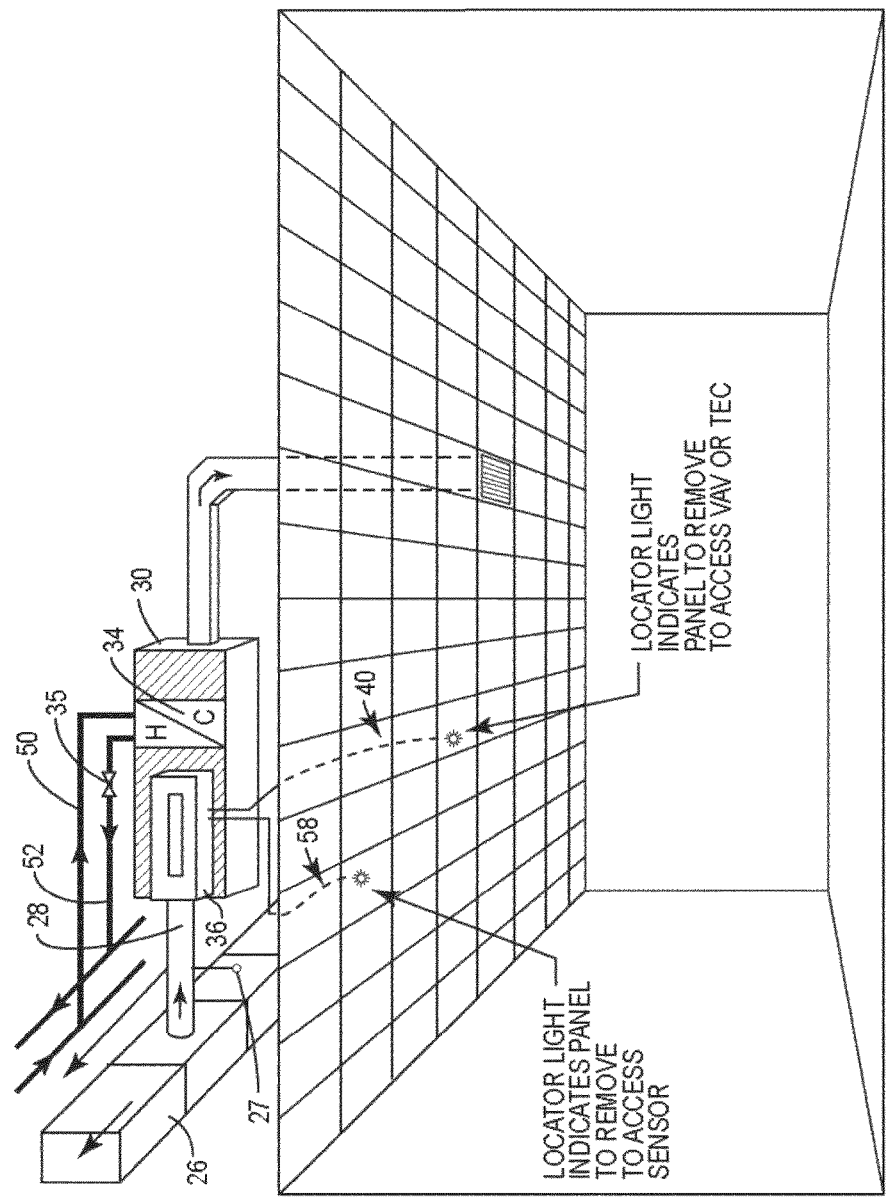
FIG. 6 is a perspective view of a VAV/TEC disposed above a drop ceiling, with a locator light assembly connected.

FIG. 6 is a perspective view depicting how the locator light 48 indicates to a technician which panel of the drop ceiling should be removed to best access the VAV 30, TEC 36, sensor 27, or other HVAC component for service. For example, a first locator light 40 indicates a panel to be removed to access the VAV 30 or TEC 36. A second locator light 58 indicates the panel to be removed to access the sensor 27. In general, whenever HVAC components which may require service are disposed behind a surface, such as a drop ceiling, a locator light assembly 40, 58 may be mounted to indicate the panel of the surface to remove for access to the component. Each locator light assembly 40, 58 is connected to a different spare digital output of the TEC 36, and hence may be independently actuated by the FMP. In one embodiment, the locator light assemblies 40, 58 may be differentiated, such as by using different colored transducers 48.

In the embodiment that the panel is a drop ceiling (as depicted in FIG. 6), the locator light assembly 40, 58 may be easily removed from the sleeve 56 which is embedded in the drop ceiling panel, so that the panel may be placed out of the way without disconnecting the locator light assembly 40, 58 from the TEC digital output port 36d. This also allows the illuminated locator light assembly 40, 58 to be used as a task light while servicing the HVAC component. In one embodiment, the locator light 48 is mounted in a panel adjacent to the panel which should be removed for optimal access to the VAV 30 or TEC 36. In this embodiment, the locator light assembly 40, 58 may be permanently installed in the ceiling panel.

Figure 7:
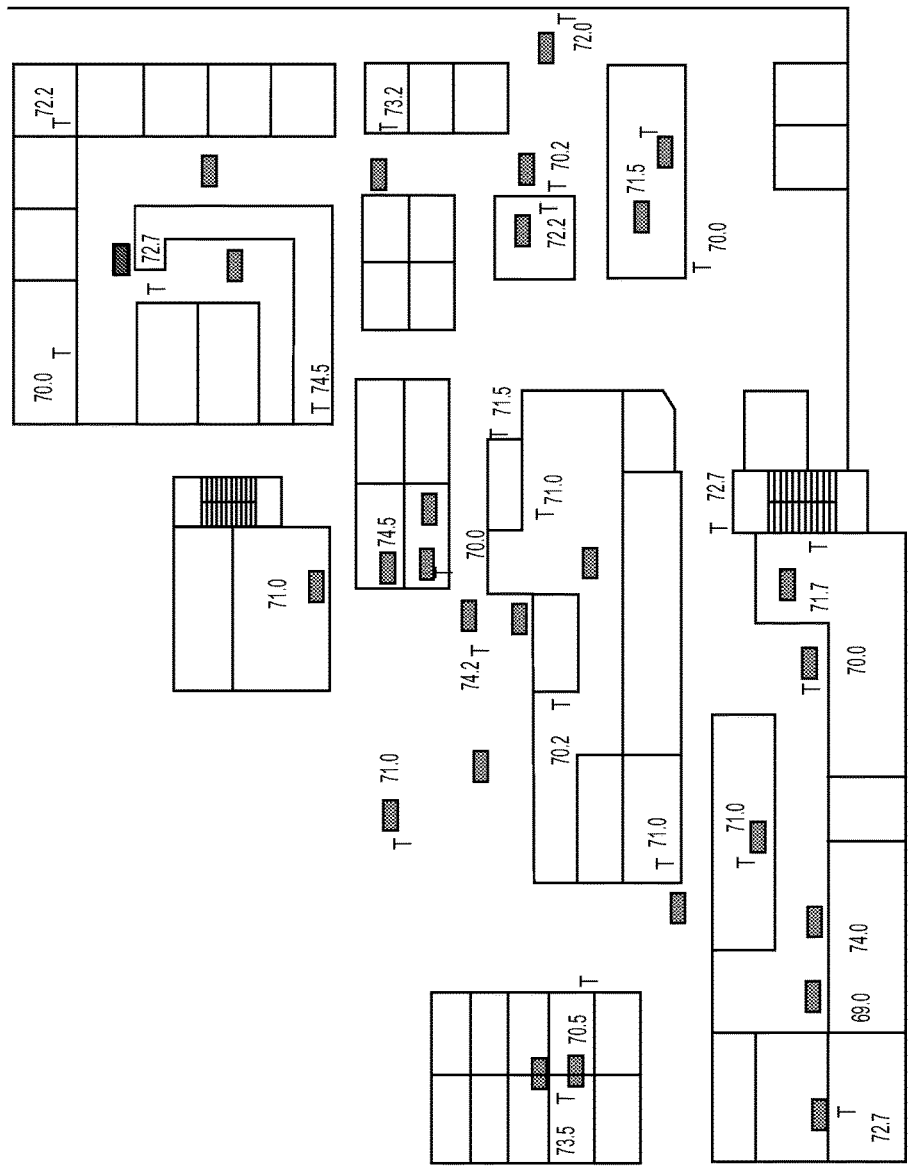
FIG. 7 is a representative display of a Facilities Maintenance Program (FMP).

According to embodiments of the present invention, a locator light assembly 40 is attached to every TEC 36 in a facility, and controlled from a central FMP. FIG. 7 depicts one representative display of a FMP. In this display, a floor plan is reproduced, with each VAV 30 and associated thermostat appearing as schematic representations (e.g., a black rectangle and the letter "T," respectively). A temperature displayed near each thermostat is the ambient air temperature of the room or area. The FMP monitors operation of the HVAC system throughout the facility. The FMP may have warning triggers programmed—e.g., it may trigger an alarm if any room or area reports a temperature in excess of a predetermined threshold (e.g., 80° F.). Additionally, the FMP may monitor specific operation of each VAV 30, such as the position of a damper 32, the state of a hot water control valve 35, and the like. In this case, the VAV 30 or TEC 36 may indicate a fault or a need for service. Alternatively, the FMP may indicate a VAV 30 or TEC 36 requires service for other reasons, such as an expired timer indicating a filter change or other routine maintenance.

However a fault or other need for service is detected or indicated by the FMP, a user may select the indicated VAV 30 or TEC 36 in the FMP GUI, and indicate that it should illuminate an attached locator light 48. Such indication may occur in numerous ways, as those of skill in the art will appreciate. For example, a user may double-click a schematic representation of the equipment to be serviced, may launch a menu associated with it and make an appropriate selection, or the like. However indicated, in response, the FMP then writes a value to a digital output port 36d of the associated TEC 36 that illuminates an attached locator light 48. For example the FMP may read the current value of the digital output port 36d and XOR that value with a mask comprising all 0's with a 1 in the bit position(s) associated with the digital output controlling the locator light(s) 48 to be illuminated. The resulting value is then written to the digital output port 36d. A technician may then be directed to the room or area to service the equipment.

Upon completion of the service, such as when a technician informs the FMP user that the service has been completed, the user may select the VAV 30 or TEC 36 within the FMP, and indicate that the locator light 48 should be extinguished. For example, the FMP may read the current value of the digital output port 36d and repeat the XOR operation described above, using the same mask value. This will reset the indicator light bit to 0 while maintaining the state of other digital outputs. Upon writing this value to the digital output port 36d, the digital output powering the locator light 48 will output 0 V, and the locator light 48 will extinguish.

Figure 8:
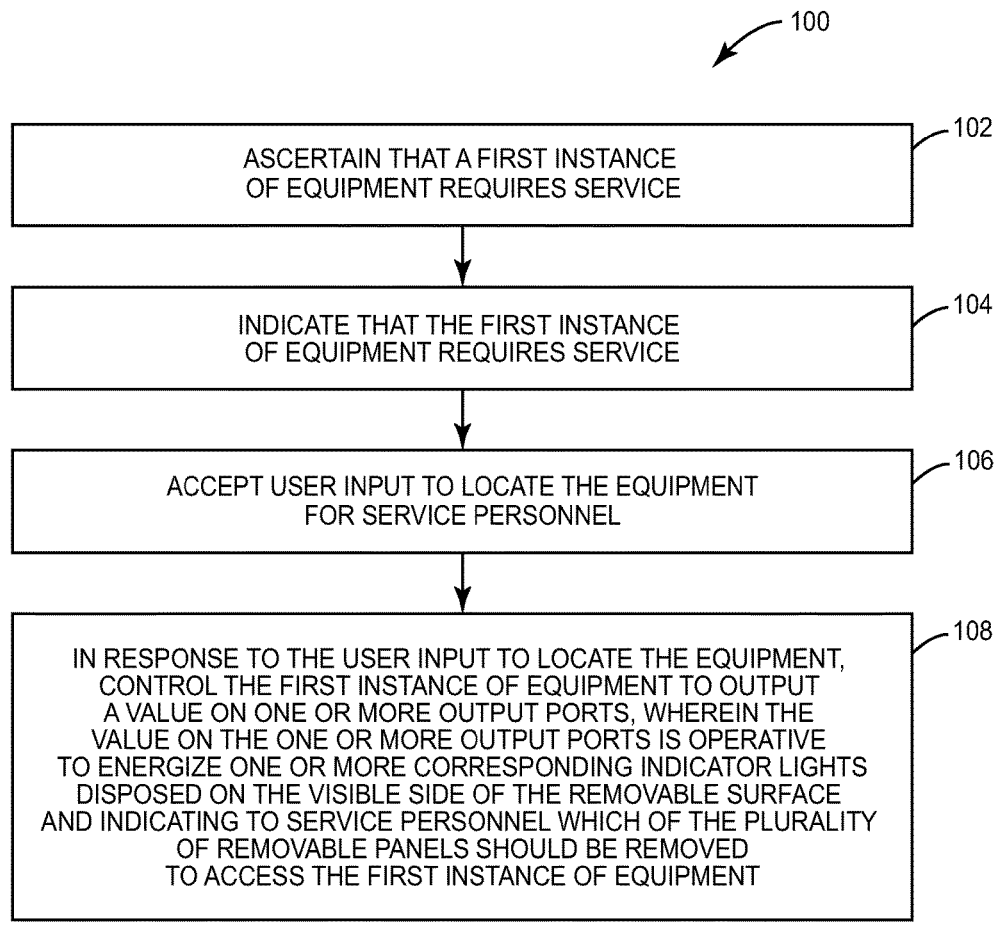
FIG. 8 is a flow diagram of a method of indicating the location of equipment requiring service.

FIG. 8 depicts a method 100, performed by a FMP executing on one or more processing devices, of indicating the location of equipment requiring service, where the equipment is disposed behind a surface comprising a plurality of removable panels. The FMP ascertains that a first instance of equipment requires service (block 102), such as via a communication from the first instance of equipment itself, failure of the first instance of equipment to respond to a control signal or command, or from surrounding circumstances, such as an excessive ambient temperature in a room or area regulated by the first instance of equipment. The FMP indicates the need for service (block 104), such as by flashing a schematic representation of the first instance of equipment on a GUI display. The FMP then accepts user input to locate the first instance of equipment for the benefit of service personnel (block 106). As known in the art, this may take a variety of forms, such as accepting a mouse click, accepting a menu selection indicated by the user, accepting a command line input, or the like. In response to the user input to locate the equipment, the FMP controls the first instance of equipment to output a value on one or more output ports operative to energize one or more corresponding indicator lights (block 108). The indicator lights are disposed on the visible side of the removable surface and indicate to service personnel which of the plurality of removable panels should be removed to access the first instance of equipment.

Those of skill in the art will recognize that the method 100 may include additional steps, such as accepting input from a user indicating that the locator lights should be extinguished, and, in response to such input, controlling the first instance of equipment to output a value on the output port(s) operative to de-energize the corresponding indicator light(s).

The method 100 may be performed by a controller, such as a state machine, general purpose processor, or Digital Signal Processor (DSP). The controller may retrieve instructions to execute the steps of method 100 from a non-transitory computer readable medium, such as solid-state, magnetic, or optical memory.

Figure 9:
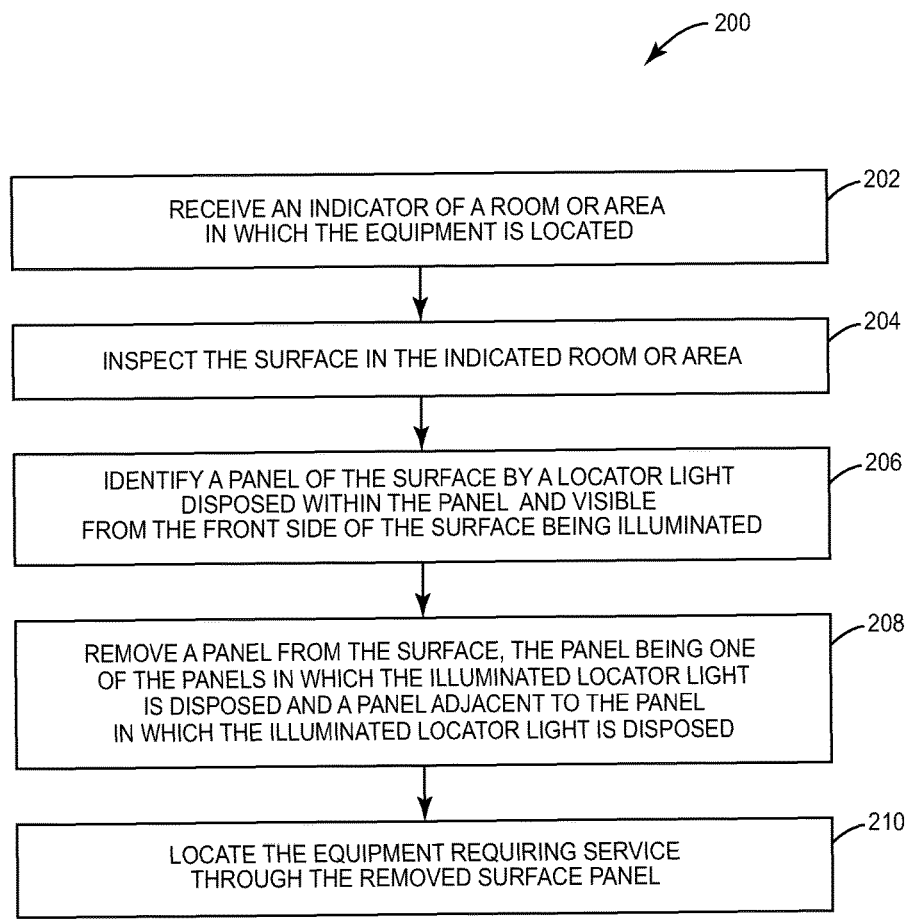
FIG. 9 is a flow diagram of a method of locating equipment requiring service.

FIG. 9 depicts a method 200 of locating, in reliance on a locator light, equipment requiring service when the equipment is disposed behind a surface having a front and back side and comprising a plurality of removable panels. Initially, a technician receives an indicator of a room or area in which the equipment is located (block 202), such as from a user of an FMP that indicates a fault or need for maintenance. The technician goes to the indicated room or area, and inspects the surface behind which the equipment to be serviced is located (block 204), such as the lower side of a drop ceiling. The technician identifies a panel of the surface by a locator light disposed within the panel and visible from the front side of the surface being illuminated (block 206). The locator light may be illuminated via a command sent from the FMP. The technician then removes a panel from the surface (block 208). In one embodiment, the panel that is removed is the panel in which the illuminated locator light is disposed. In another embodiment, the panel that is removed is the panel adjacent to the one in which the illuminated locator light is disposed. The technician then locates the equipment requiring service through the removed surface panel (block 210). Because the illuminated locator light identifies the panel to be removed, there is no need for the prior art trial and error method of removing a panel from the surface at random, and searching for the equipment to be serviced behind the surface, then (probably) replacing the first panel and removing a second panel to actually gain access to the equipment.

Those of skill in the art will recognize that the method 200 may include additional steps, such as notifying a user of the FMP that the equipment has been serviced, and inputting an indication to the FMP that the locator light should be extinguished.

Although described herein in the context of a single locator light 48, in any given implementation there may be multiple locator lights 48, each of a different color, indicating different required actions. For example, a first color (e.g., red) may indicate a fault, requiring immediate attention and repair; a second color (e.g., green) may indicate routine or preventive maintenance, which may not be as critical. The different color locator lights 48 may be implemented by providing separate locator light assemblies 40, with each connected to a different digital output of the digital output port 36d of a TEC 36.

In one embodiment, the locator light 48 may blink for higher conspicuity. The FMP may be programmed to provide a blinking locator light 48 by repeatedly, successively writing a digital 1 and 0 to the digital output of a TEC 36 to which the locator light assembly 40 is connected.

Embodiments of the present invention present numerous advantages over the prior art. Considerable time and effort is saved in locating equipment hidden behind surfaces such as a drop ceiling. Particularly where dust containment measures are mandated, the savings is considerable. Most existing HVAC systems and FMPs may be easily modified to incorporate locator lights. In complex applications, the use of different colors and/or blinking patterns of locator lights may signal different types of severity of needed maintenance. The system is inexpensive, and is unobtrusive when installed.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A locator light assembly, comprising:
    a light-emitting transducer disposed within a panel of a surface having a front and a back side, and comprising a plurality of removable panels, the transducer disposed so as to be visible, when illuminated, from the front side of the surface;

one or more conductors connecting the transducer to one or more digital outputs of a first instance of equipment disposed behind the surface, facing the back side of the surface; and a current limiting resistance interposed in series between the one or more digital outputs and the transducer, and operative to alter a voltage at the transducer from a voltage at the one or more digital outputs;

wherein the first instance of equipment is controlled to output a value on the one or more digital outputs, whereby the resulting illumination of the light-emitting transducer is operative to indicate to service personnel which of the plurality of removable panels should be removed to access the first instance of equipment for service.

2. The assembly of claim 1 wherein the light-emitting transducer is an incandescent bulb.

3. The assembly of claim 1 wherein the light-emitting transducer is a light-emitting diode (LED).

4. The assembly of claim 1 wherein the digital output generates a predetermined DC voltage in response to a value written to the output port.

5. The assembly of claim 1 wherein the digital output generates a predetermined AC voltage in response to a value written to the output port, and wherein the assembly further comprises:

a rectifier interposed between the digital output and the current limiting resistance, the rectifier operative to convert the AC voltage at the digital output to a DC voltage.

6. The assembly of claim 1 wherein the light-emitting transducer is disposed within a tubular housing, the housing disposed within the panel of the surface, and wherein the light-emitting transducer maintains a frictional fit within the tubing such that the light-emitting transducer may be removed from the panel of the surface as used as a task light to inspect the first instance of equipment.

7. The assembly of claim 1 wherein the surface comprising a plurality of removable panels is a drop ceiling and wherein the first instance of equipment is disposed between the drop ceiling and a structural ceiling.

* * * * *